United States Patent [19]
Arman

[11] 3,840,714
[45] Oct. 8, 1974

[54] STEERING-LOCKING ANTITHEFT DEVICES FOR MOTOR VEHICLES

[76] Inventor: Dario Arman, Piazza Adriano 15, Turin, Italy

[22] Filed: May 7, 1973

[21] Appl. No.: 358,200

[30] Foreign Application Priority Data
May 9, 1972   Italy.................................. 68443/72

[52] U.S. Cl...................... 200/44, 180/78, 70/252
[51] Int. Cl. ........................................... B60r 25/02
[58] Field of Search .... 200/44, 42 R; 340/63, 52 D, 340/52 R; 70/239, 238, 251, 252; 180/78

[56] References Cited
UNITED STATES PATENTS
3,569,930   3/1971   Kaisha ................................ 200/44
3,590,612   7/1971   Henning.............................. 200/44

Primary Examiner—Herman Hohauser
Attorney, Agent, or Firm—Breitenfeld & Levine

[57] ABSTRACT

In an automotive anti-theft device, of the type mounted on a steering column, a latch is mounted in a cartridge. The latch is provided with a retaining tooth engaged by a cam, the cam having a tang ending with a projecting circular sector which for a determined rotational angle of the cam engages a groove formed in the latch. The cam is coaxial with the cylinder and the tang of the lock is torsionally engaged with respect to the cam. On a section of the cam there is mounted the rotor of an electrical switch which includes a stator and resilient radial contacts cooperating with sliding contacts carried by the rotor. A seat for the insertion of a key protrudes from the end of a rocker lever oscillating around a pivot which is radially mobile. The lever also includes a tooth engageable with a seat in the latch. A spring reacts elastically to the thrust imposed on the lever by an entering key and another spring reacts to the retracting movement of the latch. Still another spring reacts to angular movement when the key is moved, to return the key automatically.

9 Claims, 20 Drawing Figures

PATENTED OCT 8 1974 3,840,714
SHEET 1 OF 3
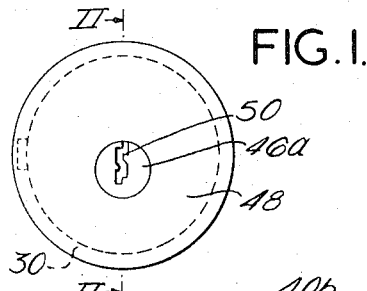
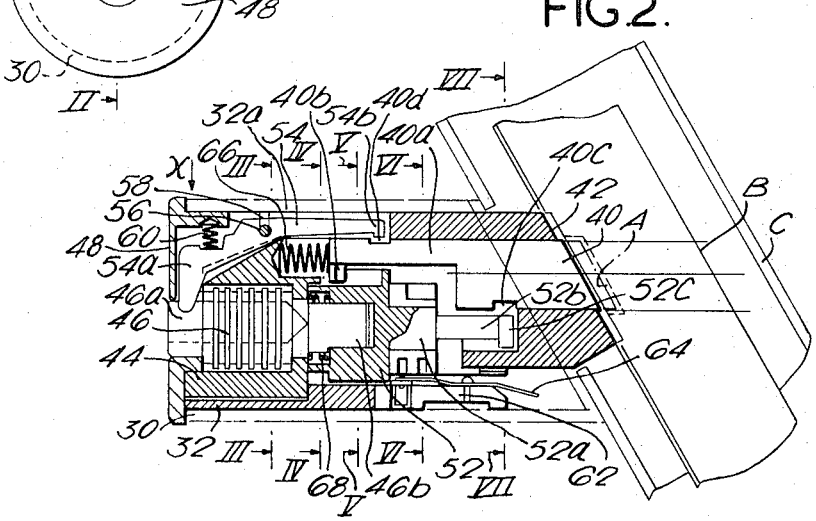
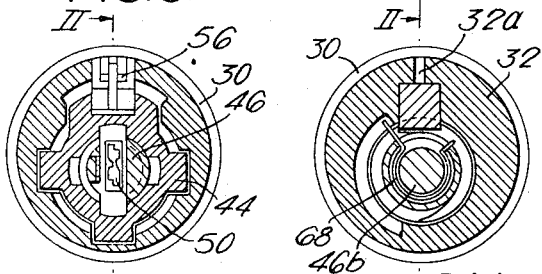
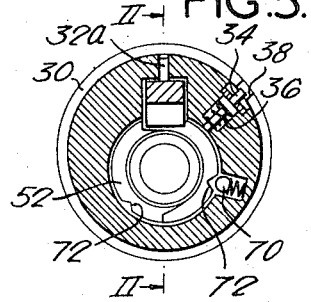
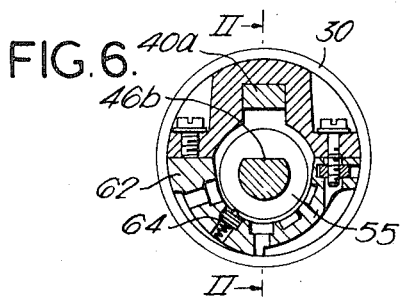
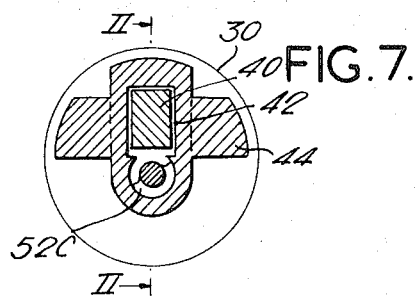

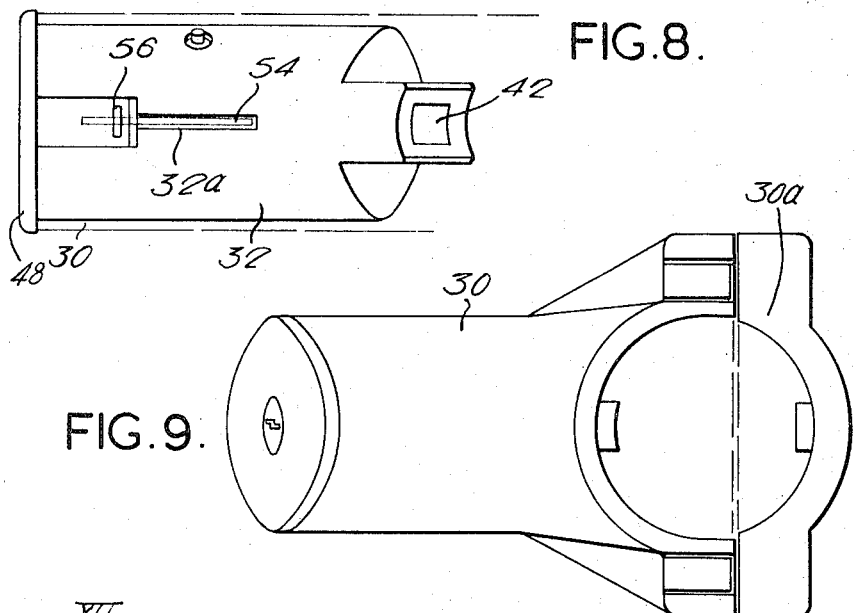

STEERING-LOCKING ANTITHEFT DEVICES FOR MOTOR VEHICLES

Steering-locking antitheft devices mounted on motor vehicles, in general, combine rotational movement imposed on a key with the actuation of an electrical switch intended for starting and running the motor of the vehicle.

The present invention relates to the steering-locking antitheft devices, including a lock controlled by a key and means, actuated by the angular movement which may be imposed on the key, which control the longitudinal movement of a latch engageable with a radial seat provided in the steering shaft, as well as the angular movement of a rotating member which is a part of an electrical switch, cooperating with a fixed member and capable to close some electrical contacts, comprising the contacts relating to the ignition circuit and the starting circuit.

As known, the above mentioned type of anti-theft devices are provided with some technical and safety features.

The main technical features of said devices are known and may be summarized as follows:

The arc of rotation which may be effected by the key inserted in the lock allows the selection of four angular positions respectively corresponding to:

"STOP", with the key being withdrawn and the steering shaft locked by the latch;

"GARAGE", key withdrawn and steering shaft free for rotation;

"RUNNING", key inserted and ignition circuit closed;

"STARTING", key inserted and starting circuit closed;

Further, when the key is left free in the angular position corresponding to starting, the key, together with the means which have been rotated and the rotor of the controlled electrical switch, must elastically return to the angular position corresponding to the "running" position.

The main practical particular and essential features this type of antitheft device is required to have, may be summarized as follows:

its fitting in the site of use must be easy;

the structure of the device must be such that any damaged member of the device may be easily replaced;

the device must provide a high grade of security against any accidental damage which may cause the undesired actuation of the latch, particularly when the motor of the motor vehicle is running;

the device must provide a remarkable security against any tampering intended to deactuate the locking of the steering without the particular key.

It is clear that the greatest difficulty in the design of said devices resides in the realization of the plurality of particular features requested and their concordance.

According to the aforesaid and in order to provide an antitheft device which fulfills all the requirements, a first particular feature of the device, according to the improvement of the invention, resides in that the same comprises two separate parts, that is, a metallic cylindrical casing which may be applied in the suitable position with respect to the steering column and the electro-mechanical assembly, forming the real device, enclosed within a cartridge and extractable with it by using the suitable key and unlocking further a security stop which normally engages the device with respect to the cartridge and is removable only when the key is inserted and rotated through a determined angle.

Another particular feature of the device according to the invention resides in that the same is provided with three security grades, effected by members cooperating with the latch and piloted by the rotation of the key which at the same time rotates the electrical switch which closes the ignition and the starting circuits of the motor vehicle motor; each of said three security grades prevents the key and hence the rotor of the electrical switch, to reach in the "starting" position if the latch locking the steering shaft, for any reason, is not completely deactuated.

Other features of this invention will become apparent by reference to the following description in conjunction with the accompanying drawings, in which:

FIG. 1 is a front view of the device;

FIG. 2 is a longitudinal section along line II—II of FIG. 1;

FIGS. 3 to 7 are cross section view of the same, respectively along lines III—III, IV—IV, V—V, VI—VI and VII—VII of FIG. 2;

FIG. 8 is a plan view of the complete device in the direction indicated by arrow x in FIG. 2 and with the tubular casing removed;

FIG. 9 is a plan view of the device according to a variant;

FIG. 10 is a longitudinal section along a plane passing thru line x—x of FIG. 9;

FIGS. 11 to 15 are transverse sections along respective lines XI—XI, XII—XII, XIII—XIII, XIV—XIV and XV—XV of FIG. 10;

Figure 14:
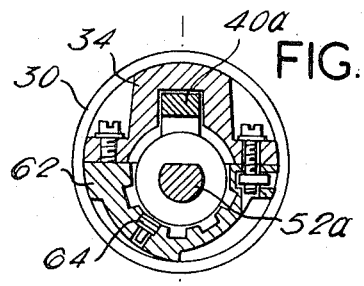
Figure 15:
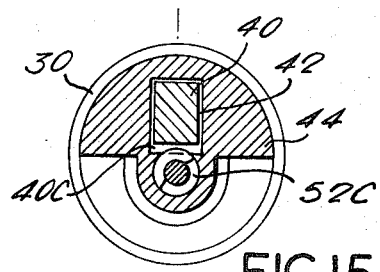

Referring to the drawing, the device comprises a casing 30 within and with respect to which, a cartridge 32 containing all the members of same device, is inserted.

In both the embodiments of the device according to the invention, the cartridge 32 of FIGS. 2 to 8, or cartridge 32c of FIG. 10, is removable by slipping it from the cylindrical or prismatic casing containing it and are therefore replaceable when any component of the assembly is damaged.

In the embodiment of the structure shown on FIGS. 1 to 8, the cartridge 32 is provided with a radial pin 34 (FIGS. 5, 8) subjected to the reaction of a spring 36 which pushes it always outwardly so that the pin 34 engages a suitable radial seat 38 formed by a through hole made in the casing 30.

A latch 40 is fitted within cartridge 32 and longitudinally slides in the seat 42 so that it may engage a radial cavity A formed in the steering shaft B, FIG. 2, coaxial to the column C. In the case represented on FIGS. 1 to 8, the cartridge device 32 is so formed as to be fitted within casing 30 coupled to column C and engaged with it in a radial position by the motorvehicle building firm.

The latch 40 is provided with a tang 40a ending with a tooth 40b. Within the cartridge 32 is non rotatably mounted a barrel 44 within which is fitted the lock blade cylinder 46 frontally closed, together with cartridge 32, by the mask 48 having a through hole for the neck 46a of cylinder 46 carrying seat 50 with a symmetrical outline for the key. The inner tang 46b of cylinder 46 is fixedly engaged with a cam 52 provided with a neck 52a on which the rotor 55 of the electrical switch is fitted, and with a stem 52b terminating with a cylindrical sector 52c suitable to engage groove 40c, provided by the latch 40, when the cam is rotated.

The cartridge 32 is formed with a longitudinal groove 32a within which is mounted with a considerable clearance, the rigid lever 54 provided with a projection 54a which, when the key is withdrawn from the cylinder 46, engages the neck of same through a longitudinal cut formed on the cylinder, while with an end tooth 54b, the lever 54 is capable to engage a corresponding seat 40d formed in the upper side of the tang 40a of latch 40. Said lever 54 is integral with a transversal pin 56 which may slide within a slot 58 radially formed in mask 48.

A spring 60 or other equivalent resilient means, tends to hold the lever 54 in the position represented on FIG. 2.

The rotor 55 of the electrical switch cooperates with the stator 62 provided with lamellar resilient contacts 64 electrically connected to the controlled circuits.

The cylindrical spring 66 mounted between end 40b of latch 40 and a suitable shoulder formed in the barrel 44, reacts resiliently to the retracting movement of latch 40, 40a, 40b; and the cylindrical spring 68 coaxial to cylinder 46, reacts resiliently to the angular movement, in a clockwise direction, which may be imposed on the cylinder through the key.

A ball pawl 70 pushed by a spring located within a radial cavity of the cartridge 32, cooperates with corresponding radial recesses 72 formed in the cylindrical skirt of cam 52, in order to define, with an elastic snap, the amplitude of the angular movements corresponding to two of the angular positions which may be imposed on the key, corresponding to the "STOP" and the "RUNNING".

Figure 16:
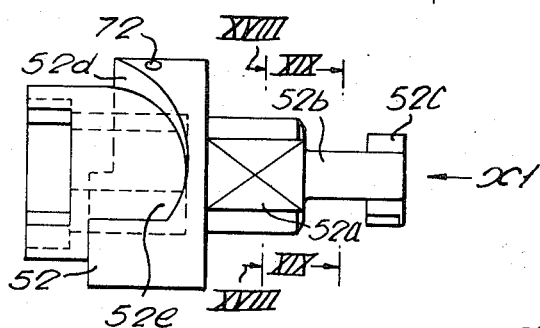
FIG. 16 is a view at a greater scale of a detail.
Figure 17:
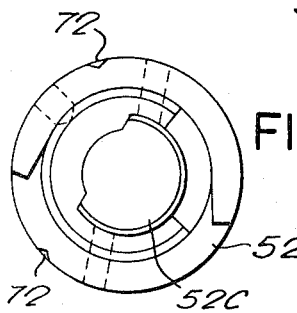
FIG. 17 is an end view of same detail in the direction indicated by arrow x1 on FIG. 16.
Figure 18:
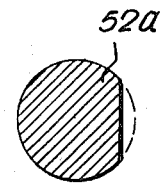
FIGS. 18 and 19 are transversal sections of FIG. 16 detail, along lines XVIII—XVIII and XIX—XIX.
Figure 19:
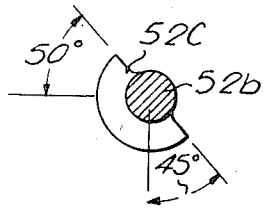
Figure 20:
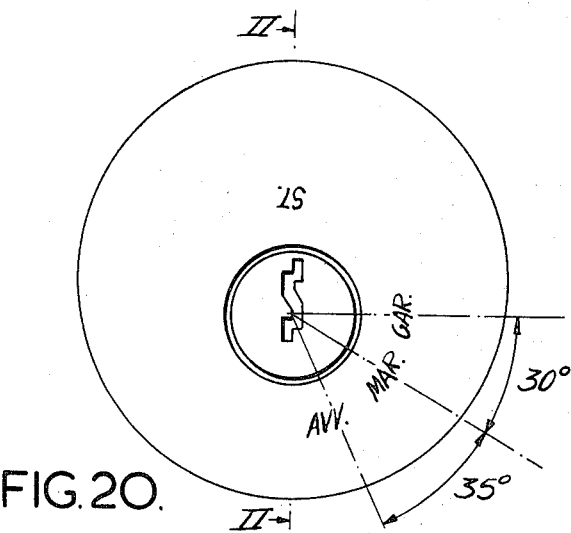
FIG. 20 is an enlarged view of the front part of the device showing the key seat which is common to both the solutions of the device.

Being stated that on FIG. 2 the members of the device are shown in the "GARAGE" position with the key extracted from cylinder 46, and therefore with the latch 40 disengaged from seat A formed in the steering shaft B, the operation of the device is as follows:

With the introduction of the key in 46a, the end 54a of lever 54 is pushed upwardly (viewed in the drawing); the spring 60 is compressed while tooth 54a of lever 54 engages the hollow seat 40d formed in the upper side of the latch. In these conditions the latch which was retained in the retracted position only by the outline section 52d (FIG. 16) of cam 52, (first security grade) is now locked in said retracted position also by tooth 54b of lever 54. Once the key has been inserted, it may be rotated either on the "STOP" position and then extracted or in the "RUNNING" position and hence in the starting position.

In the first case, that is, if the key is rotated to the "STOP" position, its angular movement rotates cam 52 and thereby the section 52d of same releases the latch tooth 40b and, the cam 52 brings its section 52e (FIG. 16) opposite to said tooth; the sector 52c does not engage groove 40c; the latch cannot slide to the right because it is retained by tooth 54b which engages groove 40d. The rotor 55 of the electrical switch has open all the controlled circuits. With the extraction of the key, the projection 54a of lever 54 is released; under the thrust of spring 60 said lever returns in the position shown on FIG. 2; its tooth 54b disengages groove 40d releasing the latch 40 which is submitted to the thrust of the preloaded spring 66.

Then, the steering wheel is rotated until the seat formed in the steering shaft B will coincide with the latch end, which enters the seat and locks thereby any movement of same steering control.

If, instead, having introduced the key in 46a the cylinder 46 is rotated from the "STOP" or from the "GARAGE" position to the "RUNNING" position, the rotor 55 of the electrical switch closes the feeding circuit and, by rotating further the key to the following "STARTING" position, the rotor 55 closes the electrical circuit which feeds the starting motor and in the same time, the rotation of the cylinder 46 charges spring 68 which, just when the key is left free, returns the cylinder, cam 52 and the rotor 55 in the angular position corresponding to the "RUNNING" position.

The third security grade, extremely important, when the key is rotated from the "RUNNING" position to the "STARTING" position, is fulfilled by the circular sector 52c integral with tang 52b of cam 52; in effect, the angular movement for the starting is only possible if the latch 40 is completely retracted and hence only when the steering shaft is completely free because the eccentric sector 52c, when the key is rotated from the "RUNNING" position to the starting position, is rotated through an angle whose amplitude is such as to bring it coinciding with the groove 40c formed in the same latch, when the latter results in the retracted position, that is, when it has deactuated the locking of the steering shaft B. This particular security feature is extremely important in that, if for any cause, and inadvertently, the trailing tooth 40b of the latch could be broken and there were not the presence of the eccentric sector 52c which allows the displacement of the key to the starring position only if the latch is retracted, it would be possible to start the engine and hence the motor vehicle with the steering shaft still locked.

It has happened, with motor vehicles provided with devices without said third security grade, that they have been started with the steering control still locked, because the possibility to start the engine was not made interdependent with respect to the position of the latch.

As shown on FIG. 5 the skirt of cam 52 has two seats 72 formed therein and wherein the ball 70 snaps when the device key is rotated to the angular running and starting positions.

In addition to the pin 34 which radially engages the casing 30 and the cartridge 32 and which allows the extraction of the latter only when the key is located in the "GARAGE" position, the external parts 30 and 48 are fixed to the cartridge 32 by means of radial screws not shown.

In the variant shown on FIGS. 9 to 15, keeping unchanged the fundamental features of the device, either as concerning the operation and the three security grades and concerning its structure, the casing 30, 30a is made of two parts, as halves, which may be coupled, as this solution is provided to apply the device on motor vehicles wherein the casing is not fixed to the steering column C by the motor vehicle building firm. Further, the pin 34 which engages the cartridge 32 to the casing 30 is omitted while the lever 54, in addition to tooth 54*b* is provided with the opposite tooth 54*c*, which, when the key is rotated in the "STOP" position, engages the radial seat 30*b* formed in the inner skirt of casing 30 and thereby it prevents the extraction of the cartridge 32 from the casing. When instead, the key is brought in the "GARAGE" position, the rocking movement of lever 54 brings the opposite tooth 54*b* of its end in engagement with the seat formed in the upper side of latch 40, and tooth 54*c* out of seat 30*b*, and therefore the whole cartridge, when the other coupling elements accessible from the exterior of casing 30 have been removed, as radial pins and/or screws, may be extracted from the casing.

From the aforesaid, the particular features of the device, according to the improvement of the invention appear clearly and may be resumed as follows:

structural simplicity two retaining members for the latch when in the retracted position;

a security member which prevents starting, if accidentally the latch remains active even when manoeuvres to deactuate it have been effected;

the internal cartridge is easily extractable from the external casing only when the key is located in the "GARAGE" position;

key with double symmetrical outline and therefore more easily insertable in the cylinder of the lock, particularly in the dark.

Obviously the steering locking device according to the invention is not limited to the arrangements shown and described; therefore it is to be understood that the embodiments described should not be construed as limitations on the claims which follow and define the invention.

What is claimed is:

1. An antitheft device for a motor vehicle having a fixed steering column containing a rotatable steering shaft, said column having an opening in its side and said steering shaft having a cavity registerable with said opening, said device comprising:
   a. a tubular casing fixed to said steering column and aligned with the opening therein,
   b. a latch within said casing and slidable with respect thereto toward and away from the steering shaft, said latch being extendable into the cavity to lock the steering shaft against rotation and retractable out of the cavity to permit rotation of the steering shaft,
   c. resilient means urging said latch toward the steering shaft,
   d. a lock mechanism rotatably arranged within said casing, said mechanism having at least two different angular positions of adjustment,
   e. a cam rotatable with said lock mechanism and having a surface inclined with respect to the longitudinal axis of said casing, a follower fixed with respect to said latch and engageable with said cam surface, said cam and follower maintaining said latch in a retracted condition when said lock mechanism is in a first position of adjustment and permitting extension of said latch into the cavity when said lock mechanism is in a second position of adjustment, and
   f. a lever within said casing and pivotable about an axis transverse to the longitudinal axis of said casing, said lever being responsive to the presence of a key in said lock when the latter is in said first position of adjustment for engaging said latch and maintaining it in its retracted position regardless of the position of adjustment to which the lock is thereafter rotated, and resilient means responsive to removal of the key from said lock mechanism for disengaging said lever and latch so that said lever discontinues maintaining said latch in its retracted position.

2. A device as defined in claim 1 including electrical switch means rotatable with said cam and arranged to actuate the ignition system of the motor vehicle when said lock is rotated to a specific position of adjustment, and means for preventing rotation of said lock mechanism to said specific position unless said latch is in its retracted condition, whereby the motor vehicle cannot be started if said latch is locking the steering shaft.

3. A device as defined in claim 2 wherein said preventing means includes a projection rotatable with said cam and movable through a path of movement which intersects said latch, said latch having a groove for accommodating said projection only when said latch is in its retracted position.

4. A device as defined in claim 1 including a cartridge accommodated within but removable from said casing, said latch, lock mechanism, cam, and lever all being arranged within said cartridge and removable from said casing as a unit with said cartridge, and replaceable within said casing by another similar cartridge.

5. A device as defined in claim 1 including a mask fixed to said casing and closing the front thereof, said mask having a central hole through which the front end of said lock mechanism protrudes.

6. A device as defined in claim 1 wherein said casing is formed integrally with the steering column.

7. A device as defined in claim 1 wherein said casing is forming in two parts adapted to be joined together with the steering column between them.

8. A device as defined in claim 1 wherein said lever has a tooth adapted to engage a seat on said latch when a key is in said lock mechanism to maintain said latch in its retracted position against the force of said resilient means (c).

9. A device as defined in claim 8 wherein the inner surface of said casing is formed with a seat, and said lever has a second tooth adapted to engage said seat, to prevent disengagement of said lever and casing, when the key is removed from said lock mechanism.

* * * * *